(12) United States Patent
Nakamae et al.

(10) Patent No.: US 8,073,025 B2
(45) Date of Patent: Dec. 6, 2011

(54) LASER LIGHT SOURCE

(75) Inventors: Kazuo Nakamae, Yokohama (JP);
Motoki Kakui, Yokohama (JP); Shinobu Tamaoki, Yokohama (JP); Yasuomi Kaneuchi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 12/702,613

(22) Filed: Feb. 9, 2010

(65) Prior Publication Data
US 2010/0202478 A1 Aug. 12, 2010

(30) Foreign Application Priority Data

Feb. 10, 2009 (JP) .................. 2009-028760

(51) Int. Cl.
*H01S 3/10* (2006.01)
*H01S 3/08* (2006.01)
(52) U.S. Cl. ............ 372/25; 372/99; 372/102; 372/105; 372/98
(58) Field of Classification Search .................. 372/25, 372/99, 102, 105, 98
See application file for complete search history.

(56) References Cited

U.S. PATENT DOCUMENTS 6,370,167 B1 * 4/2002 Donati et al. .................. 372/20

FOREIGN PATENT DOCUMENTS

| JP | 07231131 A | * | 8/1995 |
| JP | 2688303 | | 8/1997 |
| JP | 3331726 | | 7/2002 |

* cited by examiner

*Primary Examiner* — Patrick Stafford
(74) *Attorney, Agent, or Firm* — Venable LLP; Michael A. Sartori; Leigh D. Thelen

(57) ABSTRACT

The present invention relates to a laser light source having a structure for narrowing a wavelength bandwidth of output light. The laser light source comprises, at least, a laser resonator, a pumping light source, an optical path switch device, a diffraction grating, and a total reflection mirror. The laser resonator has a light amplifying fiber for output of emission light arranged on a resonance optical path thereof. The optical path switch device has a first port and a second port on the resonance optical path of the laser resonator. The diffraction grating spectrally separates the emission light outputted from the second port. The total reflection mirror reflects a specific wavelength component out of wavelength components spectrally separated by the diffraction grating, so as to feed the specific wavelength component back to the second port. Particularly, the optical path switch device controls a light transmittable state of the emission light outputted from the light amplifying fiber, at the second port.

3 Claims, 2 Drawing Sheets

LASER LIGHT SOURCE

BACKGROUND OF THE INVENTION

1. Field of the Invention

The present invention relates to a laser light source enabling pulsed oscillation of laser light.

2. Related Background of the Invention

A laser light source enabling pulsed oscillation of laser light comprises a Q-switch means for inducing oscillation in short periods of time and for achieving a very high output power per unit time, i.e., for performing a switching operation of the Q-value to a high value. Such a laser light source is, for example, described in Japanese Patent No. 3331726 (Patent Document).

The foregoing Patent Document discloses an optical fiber laser light source whose Q-switch means for modulating a loss of a laser resonator includes an acousto-optic element. In the optical fiber laser light source of the foregoing Patent Document, a reflecting film for selectively reflecting light of an oscillation wavelength is attached to one output end of the acousto-optic element. A diffraction grating is formed in the acousto-optic element only during periods hi which a high-frequency voltage is applied to the acousto-optic element, to generate diffracted light. For this reason, the diffracted light generated during the periods of application of the high-frequency voltage to the acousto-optic element ids reflected by the reflecting film to be amplified in the laser resonator. With this operation, the optical fiber laser light source enables pulsed oscillation because of the increase of the Q-value thereof.

SUMMARY OF THE INVENTION

The present inventors have examined the above conventional laser light source, and as a result, have discovered the following problems.

Namely, the optical fiber laser light source described in Patent Document amplifies all the wavelength components included in the light reflecting from the reflecting film of the acousto-optic element. For this reason, the amplified light outputted from the optical fiber laser light source comes to have a broad wavelength bandwidth.

The present invention has been developed to eliminate the problems described above. It is an object of the present invention to provide a laser light source having a structure for narrowing the wavelength bandwidth of output light A laser light source according to the present invention is a laser light source enabling pulsed oscillation of laser light, and comprises, at least, a laser resonator, pumping means, optical path switch means, spectrally separating means, and reflecting means, for solving the aforementioned problem. In the laser resonator, a laser medium to generate emission light with supply of pumping energy and to output the emission light is arranged on a resonance optical path thereof. The pumping means continuously supplies the pumping energy to the laser medium. The optical path switch means has a first port and a second port on the resonance optical path of the laser resonator. In particular, the optical path switch means controls a light transmittable state of the emission light outputted from the laser medium, at the second port; specifically, it controls a light transmittable state of the emission light propagating from the first port to the second port. The spectrally separating means is disposed on the resonance optical path of the laser resonator, and spectrally separates the emission light outputted from the second port. The reflecting means reflects a specific wavelength component out of wavelength components spectrally separated by the spectrally separating means, so as to feed the specific wavelength component back to the second port, and emits the other wavelength components to the outside of the laser light source.

The laser light source according to the present invention adopts the spectrally separating means for spectrally separating the emission light outputted from the second port, between the optical path switch means and the reflecting means, so that it can spatially and spectrally separate the light outputted from the optical path switch means, in accordance with wavelengths. Only the desired wavelength component out of the spectrally-separated wavelength components is fed via the reflecting means back to the second port, whereby the desired wavelength component is selectively amplified. Therefore, the laser light source according to the present invention is able to narrow the wavelength bandwidth of the output light emitted from the laser light source.

In the laser light source according to the present invention, the optical path switch means may further have a third port. In this case, when the second port is not in the light transmittable state of the emission light, the optical path switch means allows the emission light to pass through the third port. The third port preferably has an absorption/emission end which absorbs or emits the, emission light having propagated from the first port.

The spectrally separating means preferably includes a diffraction grating or a prism. This configuration permits the emission light outputted from the second port of the optical path switch means, to be readily spatially and spectrally separated in accordance with wavelengths.

DESCRIPTION OF THE PREFERRED EMBODIMENTS

Figure 1:
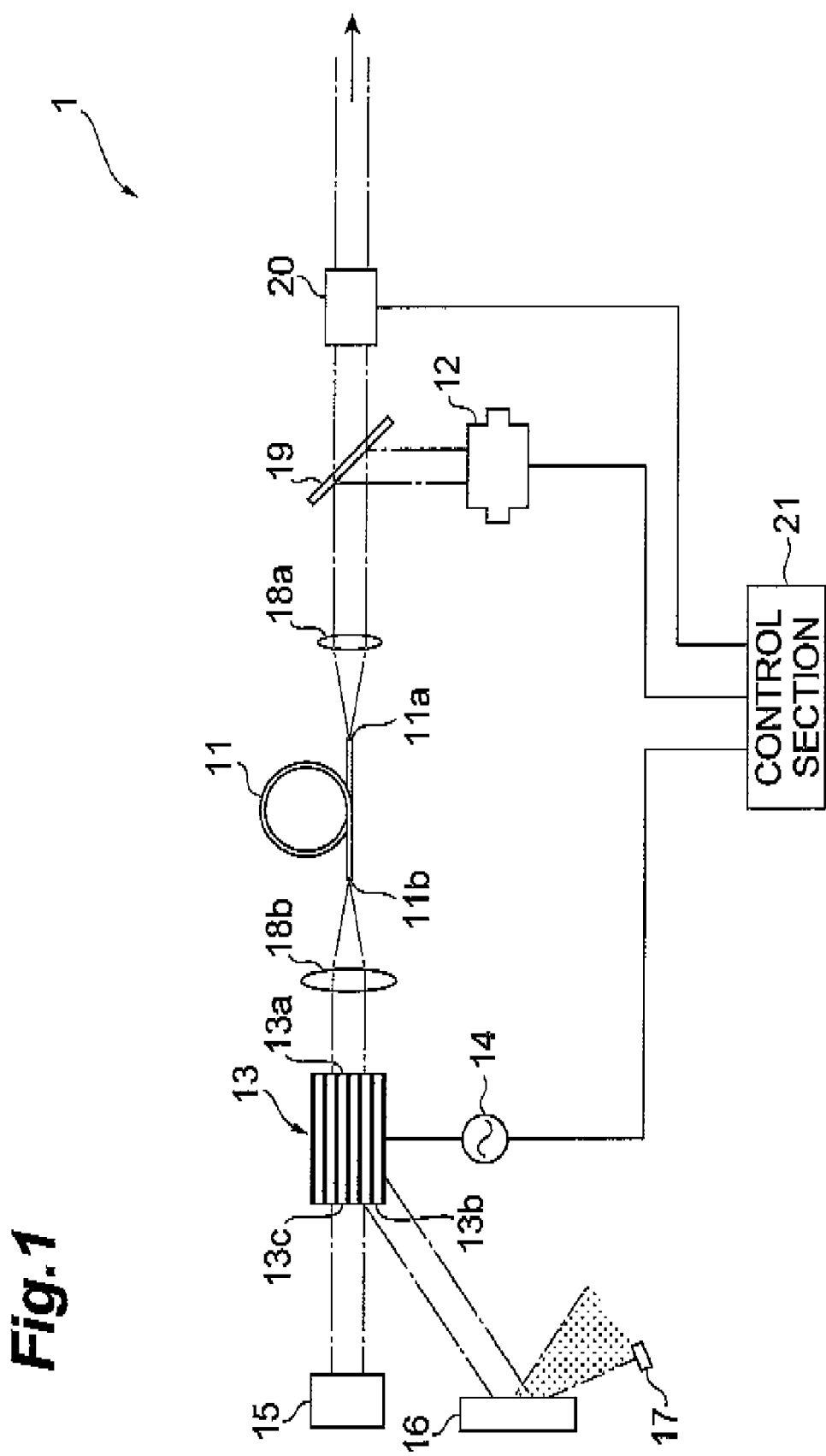
FIG. 1 is a view showing a configuration of a first embodiment of the laser light source according to the present invention.
Figure 2:
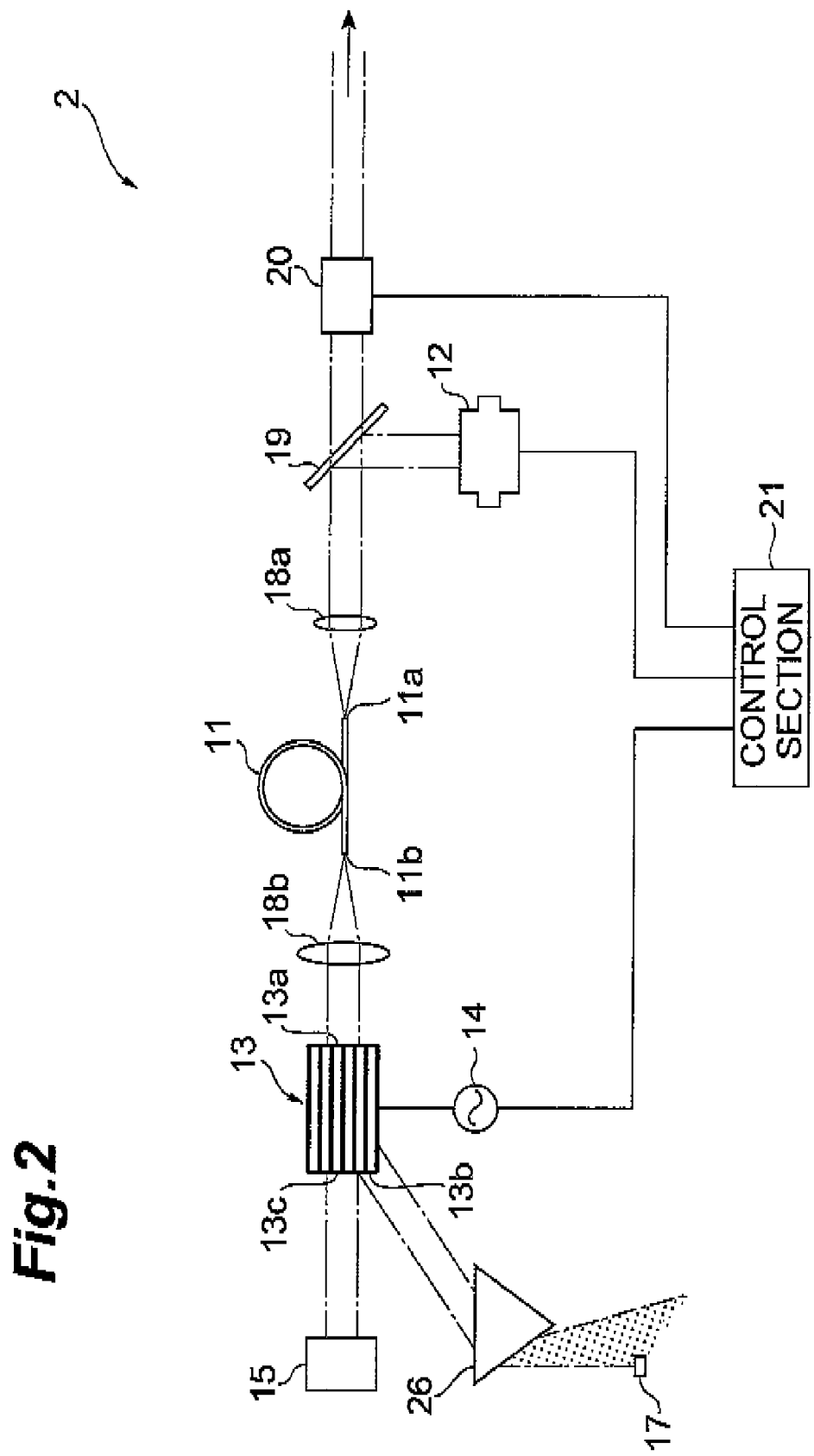
FIG. 2 is a view showing a configuration of a second embodiment of the laser light source according to the present invention.

In the following, each of embodiments of the laser light source according to the present invention will be explained below in detail with reference to FIGS. 1 and 2. In the description of the drawings, identical or corresponding components are designated by the same reference numerals, and overlapping description is omitted.

First Embodiment

First, the first embodiment according to the laser light source according to the present invention will be described. FIG. 1 is a view showing a configuration of the laser light source 1 according to the first embodiment. As shown in FIG. 1, the laser light source 1 has a optical amplifying fiber 11, a pumping light source 12, an acousto-optic element 13, a drive circuit 14, an absorption/emission end 15, a diffraction grating 16, a total reflection mirror 17, lenses 18a and 18b, a dichroic mirror 19, a variable light attenuator 20, and a control section 21.

The optical amplifying fiber 11 is an optical fiber whose optical waveguide region is doped with a rare-earth element Yb. When pumping light of a wavelength capable of pumping the rare-earth element Yb is supplied into the optical fiber 11, the rare-earth element Yb generates emission light. For this reason, the optical amplifying fiber 11 outputs the emission light generated with supply of the pumping light. Namely, in the first embodiment, the optical amplifying fiber 11 functions as a laser medium. One end face 11a of the optical amplifying fiber 11 is a vertically cleaved face and the other end face 11b of the optical amplifying fiber 11 is coated with a nonreflecting coating.

The pumping light source 12 continuously outputs the pumping light for pumping the rare-earth element Yb doped in the optical amplifying fiber 11. In particular, it includes a laser diode which outputs light having a center wavelength of 975 nm. The dichroic mirror 19 reflects the pumping light from the pumping light source 12 toward the lens 18a. The lens 18a condenses the pumping light having reached from the dichroic mirror 19, toward the end face 11a of the optical amplifying fiber 11. Furthermore, the lens 18a collimates amplified light outputted from the end face 11a of the optical amplifying fiber 11 (which is emission light generated with pumping of the rare-earth element Yb and then amplified) and outputs this collimated light toward the dichroic mirror 19. The dichroic mirror 19 outputs the collimated light having reached from the lens 18a, toward the variable light attenuator 20.

The variable light attenuator 20 attenuates the power of the light having been outputted from the end face 11a of the optical amplifying fiber 11 and having traveled in order through the lens 18a and the dichroic mirror 19, and then outputs the light with the attenuated power. Namely, the variable light attenuator 20 is an optical attenuator. The attenuation rate of the variable light attenuator 20 is variable.

The acousto-optic element (part of optical path switch means) 13 has a first port 13a, a second port 13b, and a third port 13c. The first port 13a is optically connected through the lens 18b to the end face 11b of the optical amplifying fiber 11. The second port 13b is optically connected through the diffraction grating 16 to the total reflection mirror 17. The third port 13c is optically connected to the absorption/emission end 15. The acousto-optic element 13 is driven by the drive circuit 14. In accordance with a signal from the drive circuit 14, the acousto-optic element 13 selectively turns either one of a first optical path between the first port 13a and the second port 13b and a second optical path between the first port 13a and the third port 13c into a light transmittable state.

In particular, while no high-frequency voltage is applied to the acousto-optic element 13 by the drive circuit 14, the light from the end face 11b of the optical amplifying fiber ills not diffracted in the acousto-optic element 13. In this case, the light to be outputted to the absorption/emission end 15 after passing through the second optical path, i.e., the light having passed through the third port 13c is absorbed or emitted at the absorption/emission end 15. On the other hand, while a high-frequency voltage is applied to the acousto-optic element 13 by the drive circuit 14, the light from the end face 11b of the optical amplifying fiber 11 is diffracted in the acousto-optic element 13. In this case, diffracted light passes through the first optical path (to pass through the second port 13b) to be output to the diffraction grating 16.

The lens 18b collimates the light outputted from the end face 11b of the optical amplifying fiber 11. The collimated light is guided into the first port 13a of the acousto-optic element 13. Furthermore, the lens 18b condenses the light outputted from the first port 13a of the acousto-optic element 13, toward the end face 11b of the optical amplifying fiber 11.

The diffraction grating 16 is of a reflection type. The diffraction grating 16 diffracts the light outputted from the second port 13b of the acousto-optic element 13, at diffraction angles in accordance with wavelengths, thereby spectrally separating the light into a plurality of wavelength components. The spectrally-separated wavelength components are outputted from the diffraction grating 16 so that they can travel through their respective different paths toward the total reflection mirror 17. The total reflection mirror 17 is arranged on an optical path of a desired wavelength component out of the wavelength components spectrally separated by the diffraction grating 16. The total reflection mirror 17 totally reflects the incoming desired wavelength component so that the reflected component can be fed back to the second port 13b of the acousto-optic element 13. The wavelength components not reflected are eventually emitted to the outside of the laser light source 1 to be eliminated from on the resonance optical path.

The control section 21 controls a state setting of the acousto-optic element 13 by the drive circuit 14. Furthermore, the control section 21 controls adjustment of optical powers of the pumping light source 12 and the variable light attenuator 20.

In the laser light source 1 configured as described above, the pumping light source 12, dichroic mirror 19, and lens 18a feed the pumping light into the optical amplifying fiber 11 as a laser medium and thereby function as a pumping means for continuously supplying pumping energy to the optical amplifying fiber 11. In the laser light source 1 according to the first embodiment, while the first optical path between the first port 13a and the second port 13b of the acousto-optic element 13 is in the light transmittable state, the optical system between the end face 11a of the optical amplifying fiber 11 and the total reflection mirror 17 constitutes a Fabry-Perot laser resonator. The optical amplifying fiber 11 of the laser medium is located on the resonance optical path of the laser resonator.

On the other hand, while the first optical path between the first port 13a and the second port 13b of the acousto-optic element 13 is kept in the light transmittable state by the drive circuit 14, the cavity loss of the laser resonator is modulated to switch to a higher Q-value. In this case, pulsed laser light is output and then the drive circuit 14 and acousto-optic element 13 function as an optical path switch means.

The operation of the laser light source 1 will be described below.

The pumping light with the center wavelength of 975 nm outputted from the pumping light source 12 is guided via the dichroic mirror 19 and lens 18a into the end face 11a of the optical amplifying fiber 11. With supply of the pumping energy into the optical amplifying fiber 11, Yb in the optical waveguide region of the optical amplifying fiber 11 is pumped to a higher energy level. Then Yb generates emission light during transition from the higher energy level to a lower energy level during a period of return of Yb from the pumped state to an equilibrium state) and this emission light is outputted from the optical amplifying fiber 11.

The emission light outputted from the optical amplifying fiber 11 is reflected on the end face 11a of the optical amplifying fiber 11 but is outputted from the end face 11b. Namely, the emission light outputted from the end face 11b of the optical amplifying fiber 11 is guided into the first port 13a of the acousto-optic element 13. While the high-frequency voltage is applied to the acousto-optic element 13 by the drive circuit 14 to keep the first optical path in the light transmittable state, the emission light inputted into the first port 13a travels through the first optical path to be output toward the diffraction grating 16. The emission light arriving at the diffraction grating 16 is spatially and spectrally separated in accordance with wavelengths at the diffraction grating 16. The spectrally-separated wavelength components are outputted from the diffraction grating 16 so as to propagate through their respective different paths toward the total reflection mirror 17.

The desired wavelength component out of the wavelength components output toward the total reflection mirror 17 is totally reflected by the total reflection mirror 17 located on the optical path thereof. The totally-reflected wavelength component travels via the diffraction grating 16 and returns to the second port 13b of the acousto-optic element 13. The return, beam to the second port 13b of the acousto-optic element 13 travels back and forth between the optical amplifying fiber 11 and the total reflection mirror 17 to interact with the optical amplifying fiber 11 to be amplified. This drastically increases the Q-value of the resonator. Then, pulsed light with the center wavelength of 1060 nm and with a wavelength bandwidth of 4 nm is outputted from the end face 11a of the optical amplifying fiber 11. The pulsed light having outputted travels through the lens 18a and dichroic mirror 19 to reach the variable light attenuator 20. The variable light attenuator 20 attenuates the optical power of the pulsed light having inputted into the variable light attenuator 20, and then the pulsed light with the attenuated power is then outputted therefrom.

The laser light source 1 according to the first embodiment has the diffraction grating 16 between the acousto-optic element 13 and the total reflection mirror 17. For this reason, it is able to spatially and spectrally separate the light outputted from the second port 13b of the acousto-optic element 13, in accordance with wavelengths. Only the desired wavelength component out of the spectrally-separated wavelength components is fed via the total reflection mirror 17 back to the second port 13b of the acousto-optic element 13 to be amplified as a result. Therefore, the laser light source 1 is able to narrow the wavelength bandwidth of the output light emitted from the laser light source 1.

Second Embodiment

The second embodiment according to the present invention will be described below. As shown in FIG. 2, the laser light source 2 according to the second embodiment is different from the laser light source 1 according to the first embodiment in that the laser light source 2 has a prism 26 in place of the diffraction grating 16 as a spectrally separating means. The other configuration is the same as the configuration of the laser light source 1 according to the first embodiment and therefore redundant description is omitted herein with the same elements being designated by the same reference symbols.

The prism 26 refracts the light outputted from the second port 13b of the acousto-optic element 13, at refraction angles in accordance with wavelengths, thereby spectrally separating the light into a plurality of wavelength components. The spectrally-separated wavelength components are outputted from the prism 26 so that they can travel through their respective different paths toward the total reflection mirror 17. The total reflection mirror 17 is arranged on the optical path of the desired wavelength component out of the wavelength components spectrally separated by the prism 26. For this reason, only the desired wavelength component having inputted is totally reflected by the total reflection mirror 17 and the reflected light travels via the prism 26 to be fed back to the second port 13b of the acousto-optic element 13.

The laser light source 2 according to the second embodiment is configured using the prism 26 in place of the diffraction grating 16 as a spectrally separating means. However, the prism 26 functions as an equivalent to the diffraction grating 16 of the laser light source 1. Therefore, the laser light source 2 according to the second embodiment also achieves the same effect as the laser light source 1 according to the first embodiment.

The present invention is by no means limited to the above-described embodiments. The optical path switch means in the first and second embodiments was described as the configuration including the acousto-optic element 13, but the present invention is not limited to it. For example, an optical component utilizing the electro-optical effect or the piezo-optical effect may be applied to the optical path switch means of the laser light source according to the present invention. Furthermore, the diffraction grating 16 used in the laser light source 1 is of the reflection type. However, the diffraction grating 16 may be of a transmission type as long as it can feed the desired wavelength component as an amplified object back to the second port 13b of the acousto-optic element 13 by use of a plurality of total reflection mirrors or the like.

It is also possible to reverse the control of the light transmittable state in the acousto-optic element 13 by the drive circuit 14. Namely, it is possible to adopt a configuration wherein the first optical path is in the light transmittable state without application of the high-frequency voltage to the acousto-optic element 13 and wherein the second optical path is in the light transmittable state with application of the high-frequency voltage to the acousto-optic element 13. In the first and second embodiments, the optical amplifying fiber 11 doped with Yb is used as a laser medium. However, the optical amplifying fiber 11 may be a laser medium containing another rare-earth element, e.g., Er, and doped with another fluorescent element, As described above, the laser light source according to the present invention is able to narrow the wavelength bandwidth of output light.

What is claimed is:

1. A laser light source enabling pulsed oscillation of laser light, the laser light source comprising:
    a laser resonator in which a laser medium to generate emission light with supply of pumping energy and to output the emission light is arranged on a resonance optical path;
    pumping means, separated from the laser medium, for continuously supplying the pumping energy to the laser medium;
    optical path switch means, having a first port and a second port on the resonance optical path of the laser resonator, for controlling a light transmittable state of the emission light outputted from the laser medium, at the second port;
    spectrally separating means, disposed on the resonance optical path of the laser resonator, for spectrally separating the emission light outputted from the second port; and
    reflecting means for reflecting a selected specific wavelength component out of wavelength components spectrally separated by the spectrally separating means while removing remaining wavelength components from the wavelength components spectrally separated, so as to feed the selected specific wavelength component back to the second port.

2. A laser light source according to claim 1, wherein the optical path switch means further has a third port, and the optical path switch means allows the emission light to pass through the third port when the second port is not in the light transmittable state of the emission light, and
    wherein the third port has an absorption/emission end which absorbs or emits the emission light having passed through the first port.

3. A laser light source according to claim 1, wherein the spectrally separating means includes a diffraction grating or a prism.

* * * * *